United States Patent [19]

Nahear et al.

[11] Patent Number: 5,689,820
[45] Date of Patent: Nov. 18, 1997

[54] VEHICLE LOCATION UNIT

[75] Inventors: Shemon Nahear, Giveat Zeev; Chaim Caspi, Rehovot, both of Israel

[73] Assignee: Tadiran Ltd., Holon, Israel

[21] Appl. No.: 743,923

[22] Filed: Nov. 5, 1996

Related U.S. Application Data

[63] Continuation of Ser. No. 63,235, May 18, 1993, abandoned.

[30] Foreign Application Priority Data

May 29, 1992 [IL] Israel ......................................... 102051

[51] Int. Cl.$^6$ ............................................. H04B 1/40
[52] U.S. Cl. .................................................. 455/86; 455/89
[58] Field of Search ................................. 455/33.1, 74, 86,
455/66, 67.1, 89, 76, 38.1, 38.3; 331/176;
333/30 R; 340/989, 988, 992; 375/200–203,
67; 342/389, 450, 451, 457, 463

[56] References Cited

U.S. PATENT DOCUMENTS

| | | | |
|---|---|---|---|
| 4,024,880 | 5/1977 | Reeder et al. | 333/166 |
| 4,737,969 | 4/1988 | Steel et al. | 375/67 |
| 4,746,879 | 5/1988 | Ma et al. | 331/44 |
| 4,893,097 | 1/1990 | Zwack | 331/176 |
| 4,897,642 | 1/1990 | DiLullo et al. | |
| 4,905,271 | 2/1990 | Namekawa | 379/59 |
| 5,056,109 | 10/1991 | Gilhousen et al. | 455/38.3 |
| 5,163,159 | 11/1992 | Rich et al. | 455/74 |
| 5,179,574 | 1/1993 | Wafanabe et al. | 375/1 |
| 5,193,215 | 3/1993 | Olmer | 455/66 |
| 5,251,232 | 10/1993 | Nonami | 455/84 |
| 5,309,474 | 5/1994 | Gilhousen et al. | 455/33.1 |

FOREIGN PATENT DOCUMENTS

| | | |
|---|---|---|
| 63-235877 | 9/1988 | Japan . |
| 1-177724 | 7/1989 | Japan . |
| 2-57450 | 2/1990 | Japan . |
| 2234140 | 1/1991 | United Kingdom . |

*Primary Examiner*—Reinhard J. Eisenzopf
*Assistant Examiner*—Marsha D. Banks-Harold
*Attorney, Agent, or Firm*—Merchant, Gould, Smith, Edell, Welter & Schmidt, P.A.

[57] ABSTRACT

A Vehicle Location Unit (VLU) device includes in functional relationship an RF receiver, a transmitter, a receive/transmit switch, a microcontroller to control the receiving/transmitting path, a digital Large Scale Integration (LSI), having a digital signal processing device, a crystal oscillator, and a filtering device for an outcoming signal.

8 Claims, 4 Drawing Sheets

1

VEHICLE LOCATION UNIT

This is a File Wrapper Continuation application of application Ser. No. 08/063,235, filed May 18, 1993, now abandoned.

FIELD OF THE INVENTION

The present invention relates to a vehicle location system. More particularly, the invention relates to an improved unit to be incorporated in a vehicle.

BACKGROUND OF THE INVENTION

Vehicle Location Systems (VLS) have been used for some time. Such systems comprise transmitting/receiving stations which are capable of transmitting signals specific to a given vehicle, which signals are received by the Vehicle Location Unit (VLU) of the vehicle, which in turn emits signals which are received by the various receiving stations. Receipt of a signal by four or more receiving stations makes it possible to determine the exact location of the vehicle.

These systems have a variety of applications. For instance, they are used in controlling the movement of commercial vehicles, such as lorries and taxis, busses or other vehicles the operation of which requires coordination and control. Another interesting application is the location of stolen property, particularly motorcars, or of vehicles in which an emergency situation has occurred. A motorcar incorporating a VLU can be located at all times by its VLS, through the various receiving stations positioned at different locations. Vehicle locating systems of various types are described, e.g., in U.S. Pat. No. 4,905,271, JP 02-57450, JP 01-177724 and JP 63-235877.

THE PRIOR ART

The use of these systems, however, has been limited so far due to a number of problems related to the VLU. First of all, because of their design, which utilizes conventional off the shelf radio components, the VLUs sold today are prohibitively expensive, and cannot be normally afforded by private users. This, as will be appreciated, considerably limits the applicability of these systems which could be conveniently exploited virtually in every vehicle if this problem were solved.

Another considerable drawback of existing VLUs resides in their high power consumption. Prior art VLUs have a power consumption of more than 100 mA at 12 V, and because of such high power consumption, the VLU cannot operate continuously and must be switched off when the motor is turned off, or shortly thereafter. Commercially available VLUs are normally automatically switched off about 4 hours after the motor is turned off. This means that during certain periods of time the location of the vehicle cannot be verified through this system.

An additional, and severe, drawback of existing VLUs is their relatively low reliability, due to the large number of components which must operate in a difficult environment, under mechanical and thermal shocks. Because of these factors, a high Failure rate of the VLUs is seen.

SUMMARY OF THE INVENTION

It is therefore clear that it would be highly desirable to be able to overcome the aforesaid drawbacks, and to permit thereby a widespread and everyday use of VLUs to the general public.

It is an object of the present invention to provide a VLU which overcomes the aforesaid drawbacks, which is inexpensive, highly reliable and which does not require high power consumption. The VLU hereinafter described has an average power consumption of less than 40 mA at 13.6 VDC.

It is another object of the invention to provide improved functional components which permit to carry out the operations required by the VLU in an effective and inexpensive manner.

The VLU device according to the invention comprises, in functional relationship, the following elements:
1. an RF receiver;
2. a transmitter;
3. a receive/transmit switch;
4. a microcontroller to control the receiving/transmitting path;
5. a digital LSI, (Large Scale Integration) comprising digital signal processing means; and
6. crystal oscillator and filtering means for the outcoming signal; coupled to conventional circuit elements, such as memory means, power supply means, etc.

According to a preferred embodiment of the invention, the crystal oscillator and filtering means are comprised in an analog LSI. In another preferred embodiment of the invention, the crystal oscillator and filtering means are provided as separate circuits.

As will be detailed hereinafter, the invention is not only directed to the VLU described above, but also encompasses novel elements and combinations of elements, which can be exploited in manufacturing VLUs according to preferred embodiments of the invention. All the above and other advantages and characteristics of the invention will be better understood through the following illustrative and non-limitative description of a preferred embodiment.

DETAILED DESCRIPTION OF PREFERRED EMBODIMENTS

Figure 1:
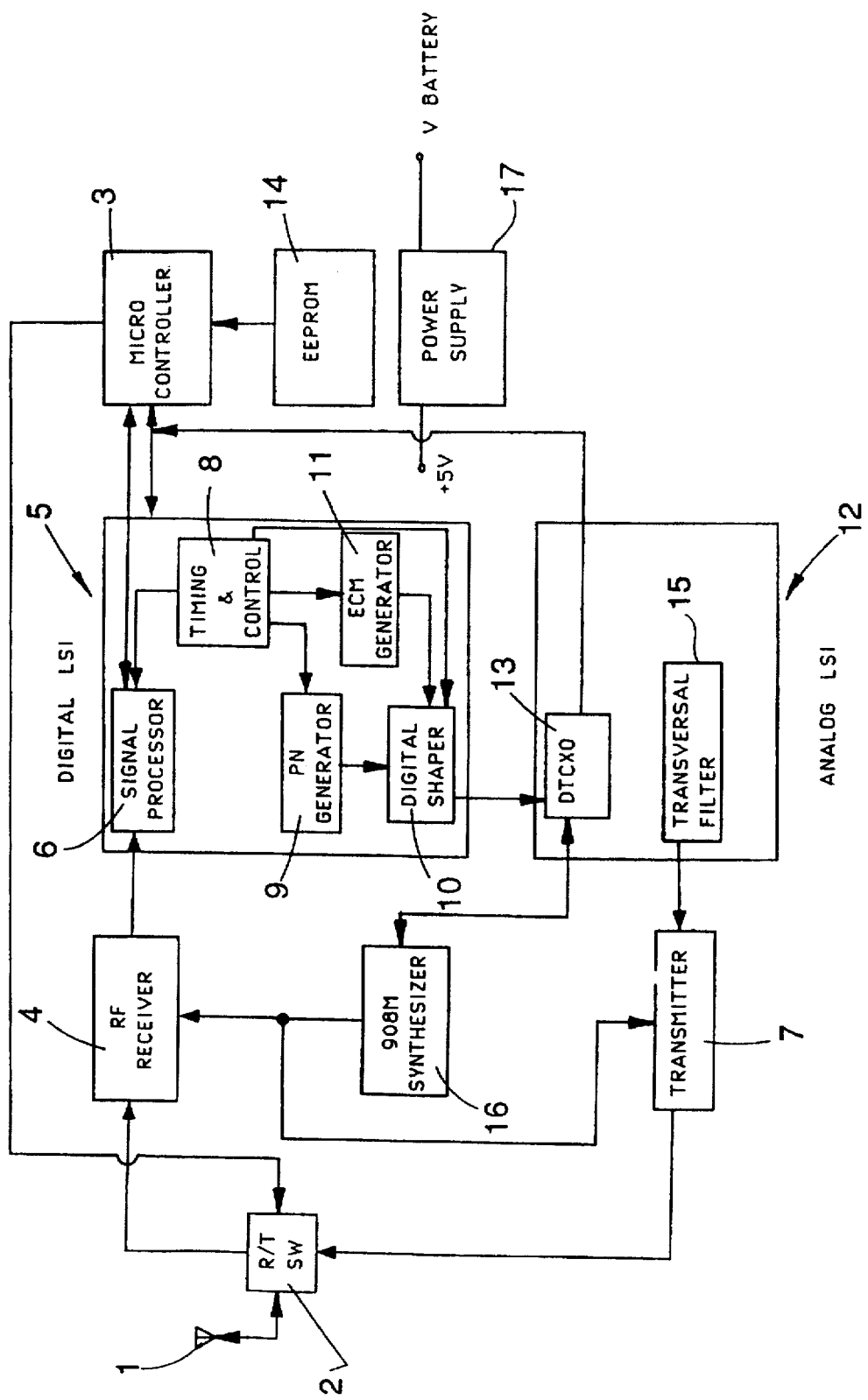
FIG. 1 is a block diagram of a VLU according to one particular embodiment of the invention.

Referring to FIG. 1, numeral 1 is an antenna which is connected, through receive/transmit switch 2, either to the receiving or the transmitting path. The operation of the switch 2 is controlled by the microcontroller 3, which signals whether the transmitting or the receiving path are to be activated at any given time.

The signals normally employed in VLSs are 925 MHz FSK modulated signals. Looking now at the receiving path, the RF receiver 4 converts the received signals into 2400 bits/sec baseband signals, and transmits them to the digital LSI 5. In the digital LSI 5 the incoming signal data are first decoded by the processor 6. The operation of the processor 6 is as follows. The data is first processed by a bit synchronizer circuit which samples the incoming bits and corrects for the difference between the system PAGER clock and the VLU clock. The output of the bit synchronizer circuit is fed to a SYNC/ADDRESS decoder, which looks for a correlation between the detected Sync word and the known Sync word, and does the same for the VLU specific address (ID) versus the detected one. This permits to make sure that proper identification of the VLU is effected. The various circuits, such as the synchronizer circuit and the SYNC/ADDRESS decoder, are conventional and providing them is within the scope of the skilled engineer. Therefore, for the sake of brevity and simplicity, such conventional circuits and means, when referred to herein, are not described in detail, it being understood that the general teachings of the art in this respect are incorporated herein by reference.

Once the decoder has detected the SYNC word, the VLU is synchronized and address detection can be carried out. The positive output of the address detection circuit, indicating that detection has been successfully carried out, interrupts the microcontroller 3, which activates the transmitter 7 at the predetermined timing.

The timing and control circuit 8 initializes and stops the various procedures which take place during reception and transmission, by providing the necessary timing and control signals. It is an advantageous feature of the invention that the circuit parameters are set by the microcontroller, and therefore it is possible to employ the timing circuit outputs for each specific transmission/reception phase of operation of the VLU, since its operation can be easily programmed. This, as will be apparent to the skilled person, provides for an enhanced performance of the unit.

As will be appreciated, the output of the VLU must have a predetermined shape, according to the accepted standards. This is achieved by providing a PN Generator circuit 9, which comprises a 10 bit register with feedback, which generates the required bit pattern. The PN data so generated are input to the Digital Shaper 10, which rotates them to provide the necessary shaping control signals.

The ECM (Emergency Channel Message) Generator 11 circuit comprises digital logic, dataloading register and a parallel load shift register. The microcontroller 3 loads the register at each "load" command with a byte. The register feeds the shift register while the ECM digital logic controls the timing and the sequence of the synchronous load commands. The procedure is repeated 16 times, so that the shift register outputs the 128 ECM bits which are then received by the digital shaper.

Figure 2:
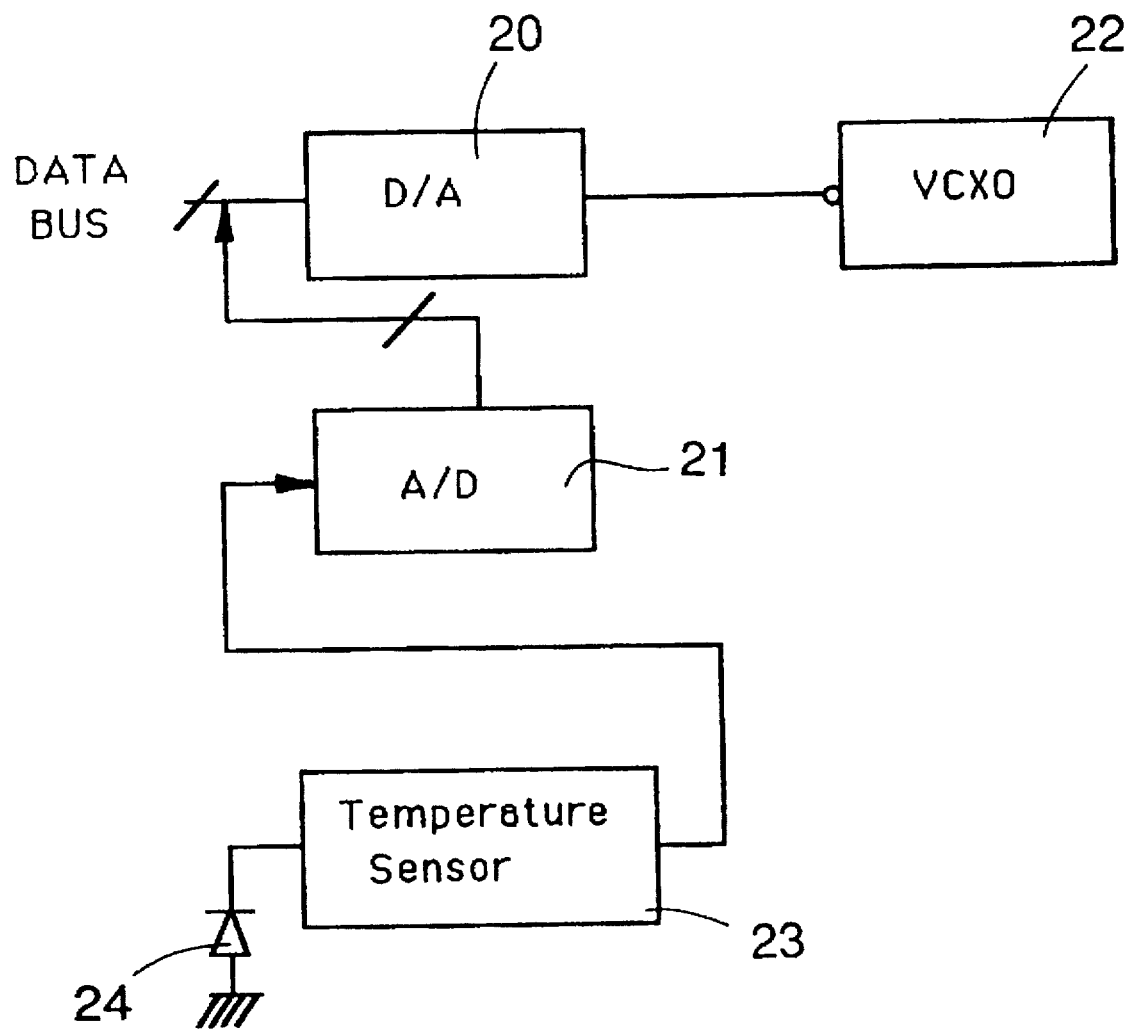
FIG. 2 illustrates the digital temperature compensated crystal oscillator (DTCXO) employed in the LSI of the VLU of FIG. 1.

The analog LSI 12 is novel in design, and incorporates the analog section of a Digital Temperature Compensated Crystal Oscillator (DTCXO), designated by numeral 13. The DTCXO, as seen in FIG. 2, comprises a digital-to-analog (D/A) converter 20, and analog-to-digital (A/D) converter 21, a voltage controlled crystal oscillator (VCXO) 22, and a temperature sensor 23 coupled to a sensing diode 24. The sensed temperature value is translated into a voltage by the temperature sensing circuit 23, and the circuit output voltage is changed according to every sensed temperature. The output of the temperature sensor circuit is fed to the A/D 21, which translates the voltage levels into bytes that are read by the data bus of the microcontroller 3.

As stated, the analog LSI of FIG. 1 can be replaced by appropriate circuits for the. DTCXO and the transversal filter, according to another preferred embodiment of the invention. A separate figure is not provided, for the sake of brevity, as this substitution is clear to the skilled person.

Returning now to FIG. 1, the microcontroller 3 is coupled to an erasable programmable read only memory, which according to a preferred embodiment of the invention is EEPROM 14. EEPROM 14 contains a table in which the compensation values for the VCXO 22 (FIG. 2) are stored. These values are read by microcontroller 3, which writes the appropriate values into the input of the D/A convertor 20. The D/A output voltage is fed into the VCXO compensation voltage input so as to maintain its frequency within ±1 ppm through the full operating range.

Figure 3:
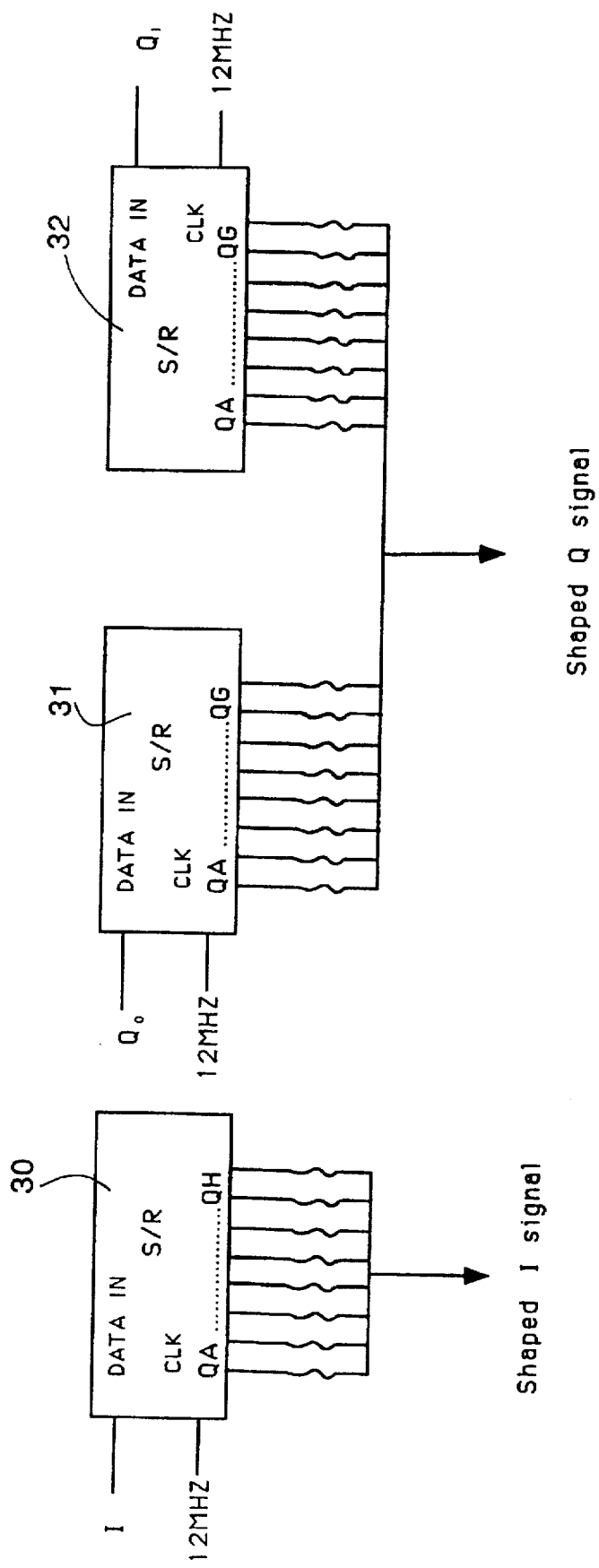
FIG. 3 is a diagram of the transversal filter employed in the VLU of the invention.

The Analog LSI 12 also contains a transversal filter 15. This filter and its use, within the context of this invention, are novel and as such also form a part of the invention. The filter 15 provides the transmitter 7 with a sine-shaped bit stream on its real (I) and imaginary (Q) outputs. This is further illustrated in FIG. 3, in which the functional diagram of filter 15 is shown. As seen in this figure, the (I) data bit stream input to shift register 30 is converted into an analog shaped data output which is the sum of the shift register outputs divided by the respective resistors values. The ($Q_0$) and ($Q_1$) data bit streams inputs to shift registers 31 and 32 respectively, and are converted to an analog shaped data output which is the sum of the output of the shift registers divided by the respective resistor values.

The transversal filter, if properly designed, specifically by the proper selection of resistor values, together with the shaping function design implemented in the digital shaper 10 (FIG. 1), optimizes the tradeoff required by the system to meet both the FCC and the location accuracy requirements.

In FIG. 1, additional functional elements can be seen. The 908M synthesizer 16, which is conventional in construction, is interfaced with the Analog LSI 12. The synthesizer is based on a frequency multiplier which multiplies the reference DTCXO frequency and provides local oscillator for both the receiver and the transmitter sections. Also a power supply means, which can be supplied by the battery of the vehicle, or by an external battery, is of conventional type, and is therefore not discussed herein in detail.

Figure 4:
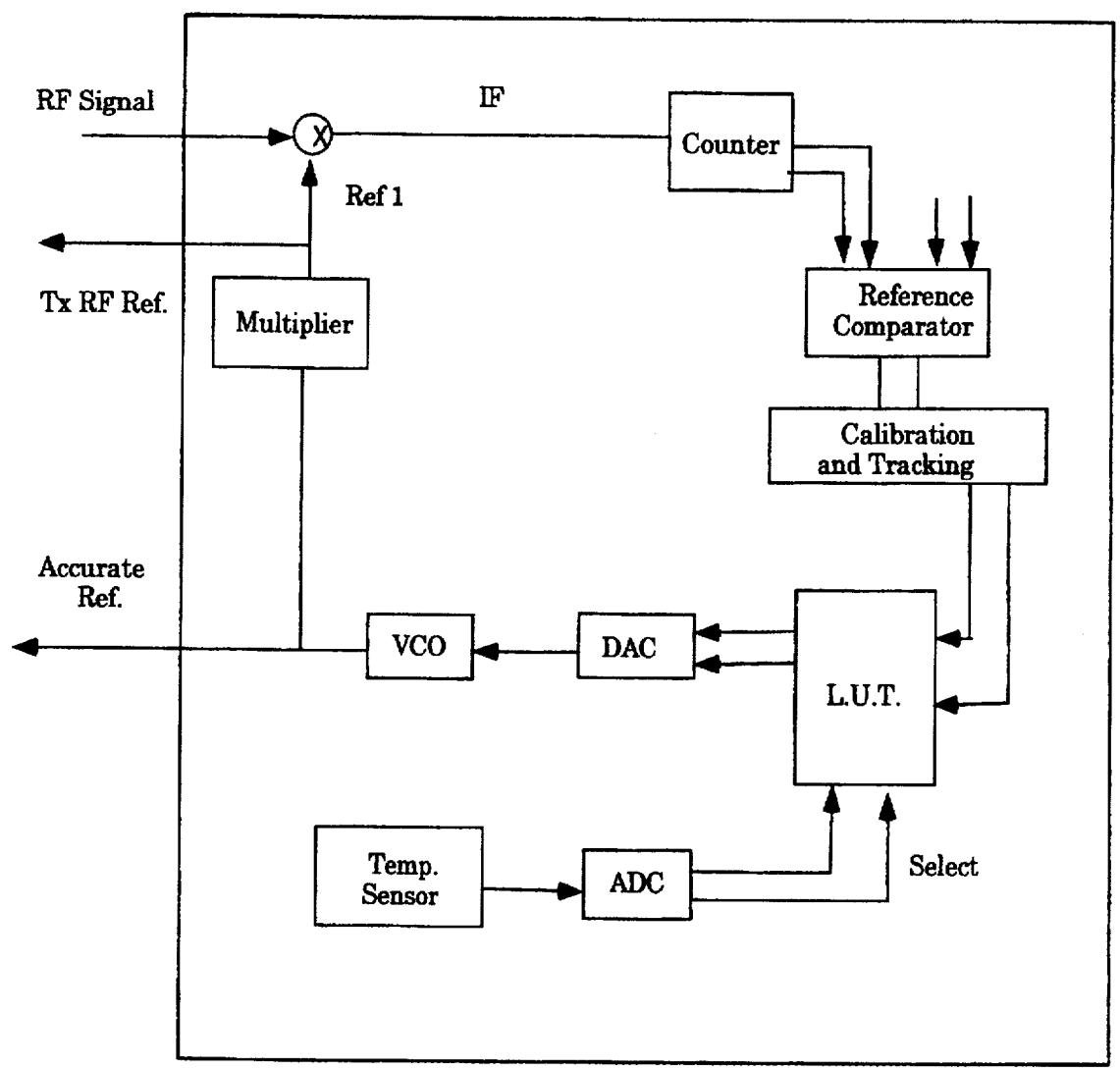
FIG. 4 is a diagram of a TCXO system used when the analog LSI of FIG. 1 is replaced by separate circuits for the DTCXO and the transversal filter.

FIG. 4 illustrates an additional improvement of the DTCXO circuit intended to solve drift problems caused by crystal aging. This is done, according to one embodiment of the invention, using the receive channel signal as a reference frequency.

As in the analog LSI, the TCXO system is based on a standard VCO (voltage controlled oscillator) controlled by the system. The compensation value from the L.U.T (look-up table) driven by DAC (Digital to Analog Converter) is used to control the VCO. The address to the L.U.T. is based on a T.S. (Temperature Sensor) driven by ADC.

The L.U.T. is filled during a calibration procedure and updated (for aging) during the tracking procedure. As reference to the calibration and tracking loop, the system uses the received RF signal of the FCM (Forward Channel Messages). The VCO frequency is multiplied to generate REF1 frequency for down-converting the FCM RF signal to IF level. The IF frequency is counted in the calibration counter and compared to a reference count. The deviation of the measured IF frequency from a known reference IF frequency generates an offset value added to the L.U.T value for the appropriate address according to the temperature sensor output.

As will be apparent to the skilled engineer, the device according to the invention can be provided in many different embodiments. For instance, the Digital LSI 5 can be engineered to contain a more limited number of functional elements, e.g., the signal processor 6 or the digital shaper 10 could be conventional units, external to, and interfaced with, LSI 5. While this arrangement would diminish some of the advantages of the invention, by increasing the cost of the unit, decreasing it reliability, due to the increased number of

We claim:

1. A Vehicle Location Unit (VLU) device having means for transmitting a signal, means for receiving a signal, a microcontroller for controlling a transmitting/receiving path, and conventional circuit elements comprising memory means, power supply means, the device comprising:

a digital Large Scale Integration (LSI) including:
   timing and control means for providing a timing and control signal to each transmission/reception phase of operation of the VLU;
   a signal processor being connected to the receiving means and the timing and control means, the signal processor receiving a signal from the receiving means;
   a PN generator being connected to the timing and control means, the PN generator generating a required bit pattern to a digital shaper; and
   said digital shaper having a first input which is connected to the timing and control means and a second input based on said required bit pattern, which is connected to the PN generator, the digital shaper outputting a shaping control signal to an analog LSI; and said analog LSI including:
   a Digital Temperature Compensated Crystal Oscillator (DTCXO) for sensing a temperature and translating the sensed temperature into digital data which are read by the microcontroller; and
   a transversal filter converting said shaping control signal into an analog-shaped data, the transversal filter having an output which is connected to the transmitting means.

2. A Vehicle Location Unit (VLU) device according to claim 1, wherein the DTCXO comprises a temperature sensing means coupled to A/D converting means, and a Voltage Controlled Crystal Oscillator (VCXO) coupled to D/A converting means, and means for reading compensation values for the VCXO from a data bus which contains prestored compensation values.

3. A Vehicle Location Unit (VLU) device having means for transmitting a signal, means for receiving a signal, and conventional circuit elements comprising memory means, power supply means, the device comprising:

a digital Large Scale Integration (LSI) being connected to the receiving means; and
an analog LSI comprising:
   a Digital Temperature Compensated Crystal Oscillator (DTCXO) being coupled to the digital LSI, the DTCXO sensing a temperature and translating the sensed temperature into digital data, and the DTCXO sending a control signal to the digital LSI; and
   a transversal filter converting a data bit stream into an analog-shaped data, the transversal filter having an output which is connected to the transmitter means.

4. A Vehicle Location Unit (VLU) device comprising means for transmitting a signal, means for receiving a signal, and conventional circuit elements comprising memory means, and power supply means, the device comprising:

a digital Large Scale Integration (LSI) including:
   a signal processor connecting to the receiving means and receiving a signal therefrom;
   a PN generator;
   timing and control means connected to said processor and said generator for initializing and stopping the transmission/reception phases of operation of the device;
   a digital shaper receiving the data generated by said generator; the device further comprising:
      a Digital Temperature Compensated Crystal Oscillator (DTCXO) being coupled to the digital LSI, the DTCXO sensing a temperature and translating the sensed temperature into digital data, and the DTCXO sending a control signal to the digital LSI; and
      a transversal filter converting a data bit stream into an analog-shaped data, the transversal filter having an output connected to said transmitting means.

5. A Vehicle Location Unit ((VLU) device according to claim 4, wherein the DTCXO comprises temperature sensing means coupled to A/D converting means, and a Voltage Controlled Crystal Oscillator (VCXO) coupled to D/A converting means, and means for reading compensation values for the VCXO from a data bus which contains prestored compensation values.

6. A Vehicle Location Unit (VLU) device according to claim 4, wherein the DTCXO and the transversal filter are comprised in an analog LSI.

7. A Vehicle Location Unit (VLU) device according to claim 4, further comprising an ECM generator.

8. A Vehicle Location Unit (VLU) device, according to claim 7, wherein the ECM generator has an input connected to the timing and control means and an output connected to the digital shaper.

* * * * *